USO12388229B1

(12) United States Patent
Diels et al.

(10) Patent No.: US 12,388,229 B1
(45) Date of Patent: Aug. 12, 2025

(54) FIBER LASER WITH TWO COUNTER-PROPAGATING, ORTHOGONALLY POLARIZED PULSES FOR HIGH PRECISION METROLOGY

(71) Applicant: UNM Rainforest Innovations, Albuquerque, NM (US)

(72) Inventors: Jean-Claude Diels, Albuquerque, NM (US); Hanieh Afkhamiardakani, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 1044 days.

(21) Appl. No.: 17/368,455

(22) Filed: Jul. 6, 2021

Related U.S. Application Data

(60) Provisional application No. 63/048,450, filed on Jul. 6, 2020.

(51) Int. Cl.
*H01S 3/067* (2006.01)
*H01S 3/094* (2006.01)
*H01S 3/10* (2006.01)
*H01S 3/1115* (2023.01)

(52) U.S. Cl.
CPC ........ *H01S 3/067* (2013.01); *H01S 3/094003* (2013.01); *H01S 3/094038* (2013.01); *H01S 3/10061* (2013.01); *H01S 3/1115* (2013.01)

(58) Field of Classification Search
CPC ............... H01S 3/067; H01S 3/094003; H01S 3/094038; H01S 3/10061; H01S 3/1115
See application file for complete search history.

(56) References Cited

U.S. PATENT DOCUMENTS

| 2004/0184148 A1* | 9/2004 | Chang | G02B 6/272 |
| | | | 359/489.09 |
| 2009/0003391 A1* | 1/2009 | Li | H01S 3/1118 |
| | | | 372/6 |
| 2016/0204565 A1* | 7/2016 | Barre | H01S 3/1062 |
| | | | 372/6 |
| 2019/0280450 A1* | 9/2019 | Heckl | G01J 3/427 |

OTHER PUBLICATIONS

V. Mamidala et al., "Graphene-based passively mode-locked bidirectional fiber ring laser," Opt. Express 22, 4539-4546 (2014) (Year: 2014).*

* cited by examiner

*Primary Examiner* — Xinning (Tom) Niu
(74) *Attorney, Agent, or Firm* — Schwegman Lundberg & Woessner, P.A.

(57) ABSTRACT

Apparatus, systems, and methods for a bidirectional mode-locked all-polarization maintaining fiber laser with two counter-propagating, orthogonally polarized pulses are applicable in a variety of applications. A mode-locked fiber laser can be realized with a laser cavity including a first polarization maintaining gain fiber, a second polarization maintaining gain fiber, and a saturable absorber. The saturable absorber can be arranged with the first polarization maintaining gain fiber and the second polarization maintaining gain fiber to generate two counter-propagating pulses, being orthogonally polarized with respect to each other. The laser cavity can include a circulator arranged to provide separate paths for the two counter-propagating pulses in a portion of the fiber laser cavity.

20 Claims, 7 Drawing Sheets

FIBER LASER WITH TWO COUNTER-PROPAGATING, ORTHOGONALLY POLARIZED PULSES FOR HIGH PRECISION METROLOGY

RELATED APPLICATION

This application claims priority under 35 U.S.C. 119(e) from U.S. Provisional Application Ser. No. 63/048,450, filed 6 Jul. 2020, which application is incorporated herein by reference in its entirety.

GOVERNMENT INTEREST STATEMENT

This invention was made with Government support under Grant: NASA No. 80NSSC19C0505. The United States Government has certain rights in the invention.

FIELD OF THE INVENTION

The invention relates generally to lasers, in particular, to fiber lasers.

BACKGROUND

A fiber laser has features that make it very promising for intracavity phase interferometry (IPI) implementation for optical measurement. A mode-locked laser can be used in the IPI measurements, where two ultrashort pulses counter-circulate in the laser cavity. Some configurations for IPI measurements cause phase coupling with the back-scattered light, which can limit the sensitivity of a IPI sensor by creating a dead band region in the characteristic of the IPI response. Improvement of various designs can enhance the accuracy and precision of measurement by IPI.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration and not limitation, various example embodiments. These embodiments are described in sufficient detail to enable those skilled in the art to practice these and other embodiments. In order to avoid obscuring embodiments, some well-known system configurations and process steps are not disclosed in detail. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a bidirectional mode-locked ring fiber laser can be designed and structured to generate two counter-propagating pulses orthogonally polarized along slow and fast axes of polarization maintaining (PM) fibers for application of IPI. Mode-locking can be achieved with a saturable absorber (SA).

IPI is a technique used in high-precision metrology, in which two correlated frequency combs interfere outside the laser cavity to measure a phase shift between the combs. The phase shift is due to a physical parameter to be measured. A condition for IPI is that the two frequency combs corresponding to generated pulse trains have the same repetition rates. This condition comes true only if pulses meet at the same location in the cavity at each round trip. The mutual saturation of a SA in the IPI arrangement can force two pulses propagating in the cavity to cross at a predetermined location of the SA. Another implementation uses optical parametric oscillation synchronously pumped by a mode-locked laser to force the same repetition rate in two directions. The SA causes phase coupling with the back-scattered light from the SA, which limits the sensitivity of IPI sensor by creating a dead band region in the characteristic of the IPI response.

Figure 1:
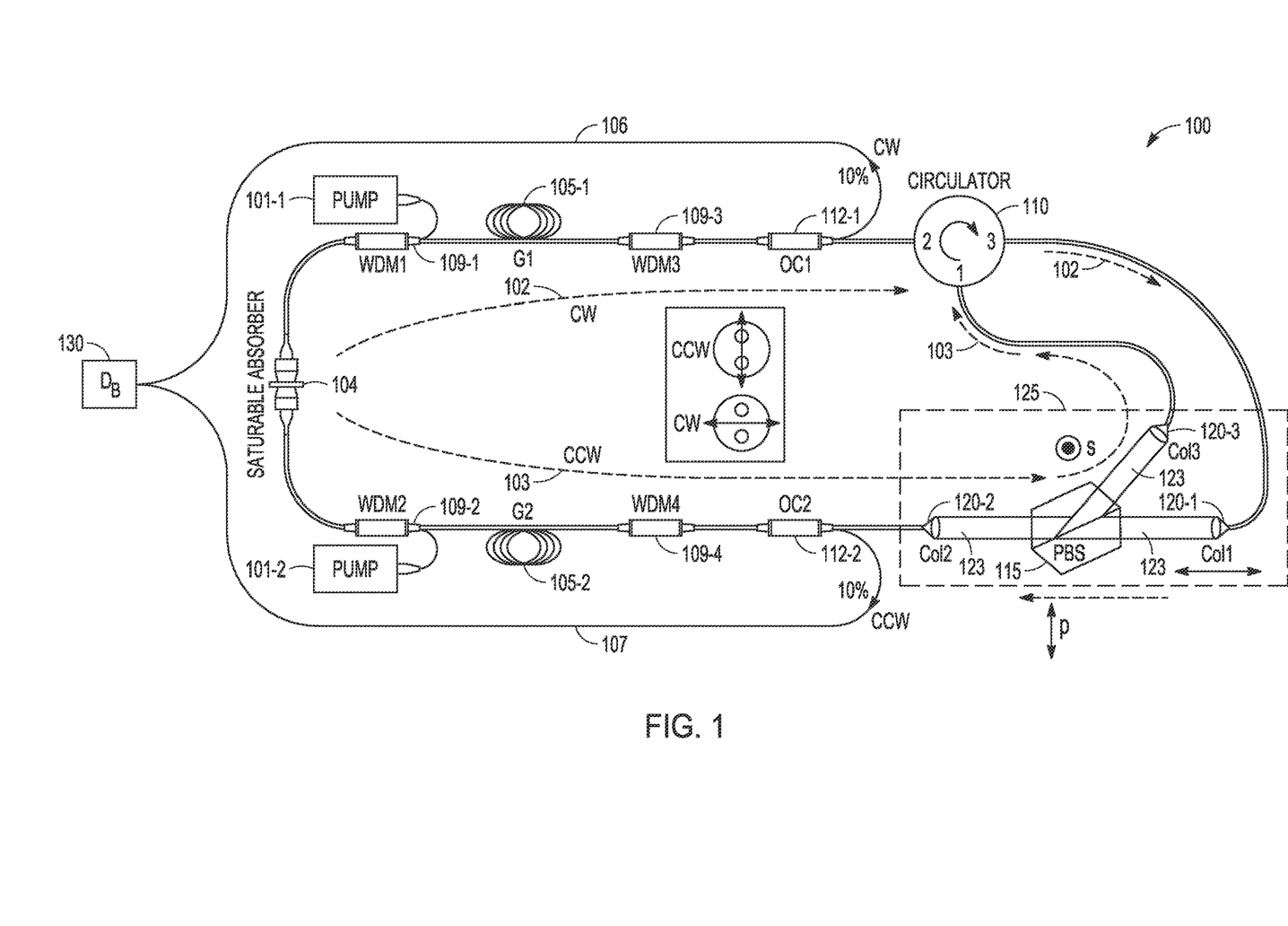
FIG. 1 is a schematic of an arrangement for an example polarization maintaining fiber laser cavity generating two cross-polarized counter-circulating pulses, in accordance with various embodiments.

FIG. 1 illustrates an embodiment of an example ring all-PM fiber laser with two counter-propagating, orthogonally polarized pulses implemented to minimize the amount of phase coupling between pulses at the SA. The fiber laser with two counter-propagating, orthogonally polarized pulses can be implemented for high precision metrology. FIG. 1 provides a schematic of an embodiment of an example arrangement 100 for a PM fiber laser cavity generating two cross-polarized counter-circulating pulses with one of the pulses circulating in the clockwise (cw) direction 102 and its counter-circulating pulse circulating in the counter-clockwise (ccw) direction 103. Shown in FIG. 1 are a number of components of example arrangement 100 including PM gain fibers 105-1 and 105-2, laser pumps 101-1 and 101-2, a SA 104, wavelength division multiplexers (WDMs) 109-1, 109-2, 109-3, and 109-4, collimators (Cols) 120-1, 120-2, and 102-3, output couplers (OCs) 112-1 and 112-2, a circulator 110, and a polarizing beam splitter (PBS) 115, where G refers to fiber gain, s refers to s-polarized, and p refers to p-polarized.

Pump 101-1 injects laser light to gain fiber 105-1 (pulses in the case of an optical parametric oscillator) through WDM 109-1 coupled to SA 104 that is coupled to WDM 109-2 through which pump 101-2 injects light to gain fiber 105-2. Pumps 101-1 and 101-2 can be operated at 980 nm. Pumps 101-1 and 101-2 can be selected to provide other operational wavelengths. From SA 104, cw pulse 102 propagates through WDM 109-1 to PM gain fiber 105-1 providing a laser gain medium having gain G1. PM gain fiber 105-1 is coupled WDM 109-3 that is coupled to OC 112-1, which couples cw pulse 102 to a detector $D_B$ 130 along external fiber path 106 and to circulator 110. OC 112-1 can provide, to $D_B$ 130, a portion of light input to OC 112-1. For example, the portion can be, but is not limited to, 10%.

An optical circulator can be used to provide separate paths for the cw pulses and the ccw pulses in a portion of the cavity of the fiber laser. An optical circulator can be implemented as a non-reciprocating, one-directional, three port PM device for bidirectional propagation of light such that light entering any port exits from the next port. In arrangement 100, light that enters port 2 exits port 3 and light that enters port 1 exits port 2. Cw pulse 102 enters port 2 of circulator 110 and exits port 3 of circulator 110 to propagate to Col 120-1. From Col 120-1, cw pulse 102 is directed to PBS 115 through which cw pulse 102 propagates to Col 120-2. From Col 120-2, cw pulse 102 propagates through OC 112-2 to WDM 109-4 to PM gain fiber 105-2 having a laser gain medium with gain G2. From PM gain fiber 105-2, cw pulse 102 propagates through WDM 109-2 back to SA 104.

From SA 104, ccw pulse 103 propagates through WDM 109-2 to PM gain fiber 105-2 providing a laser gain medium having gain G2. PM gain fiber 105-2 is coupled WDM 109-4 that is coupled to OC 112-2, which couples ccw pulse 103 to $D_B$ 130 along external fiber path 107 and to Col 120-2. OC 112-2 can provide, to $D_B$ 130, a portion of light input to OC 112-2. For example, the portion can be, but is not limited to, 10%. From Col 120-2, ccw pulse 103 is directed to PBS 115 which directs ccw 103 to Col 120-3 through which ccw pulse 103 propagates to port 1 of circulator 110. Ccw pulse 103 enters port 1 and exits port 2 of circulator 110 to propagate to OC 112-1 through which ccw pulse propagates to WDM 109-3. From WDM 109-3, ccw pulse 103 propagates to PM gain fiber 105-1. From PM gain fiber 105-1, ccw pulse 103 propagates through WDM 109-1 back to SA 104.

The detector $D_B$ 130 can be a beat note detector at which cw pulse 102 and ccw pulse 103 interact. A beat note detector can detect frequency difference Δν (beat note), rather than amplitude difference, between two counter-circulating light modes from a laser, by beating them together on the beat note detector. The frequency difference can be attributed to the sample under test and variations in path length of the two counter-circulating pulses, where the beat node detector can be calibrated for variations in path length not attributable to the sample under test.

The circulating of the two counter-propagating, orthogonally polarized pulses cw pulse 102 and ccw pulse 103 can be viewed in the following manner.

cw 102: SA 104>WDM 109-1>G1>WDM 109-3>OC 112-1>2>3>Col 120-1>PBS 115>Col 120-2>OC 112-2>WDM 109-4>G2>WDM 109-2>SA 104.

ccw 103: SA 104>WDM 109-2>G2>WDM 109-4>OC 112-2>Col 120-2>PBS 115>Col 120-3>1>2>OC 112-1>WDM 109-3>G1>WDM 109-1>SA 104.

The set of components Col 120-1, Col 120-2, Col 120-3, and PBS 115 form a unit 125 that is implemented with extreme precision and stability. The positioning of the components of unit 125 can be controlled by a controller operating mounting instruments. The mounting instruments can be implemented with piezoelectric devices. The unit 125 can be implemented for free space transmission between OC 112-2 and circulator 110 as part of the arrangement 100 for the PM fiber laser cavity. Free space unit 125 doesn't include optical fiber as a waveguide and transmits light through air, instead. A sample to be measured can be arranged within the free space 123 between PBS 115 and Col 120-1 (or Col 120-3). Small variations of a distance property or index of refraction of the sample can be precisely measured by arrangement 100.

The difference in paths for cw pulse 102 and ccw 103 with cw pulse 102 propagating through Col 120-1 without circulating through Col 120-3 and with ccw pulse 103 propagating through Col 120-3 without circulating through Col 120-1, can be set to zero by relative positioning of collimators (Cols) 120-1, 120-2, and 120-3.

Figure 2:
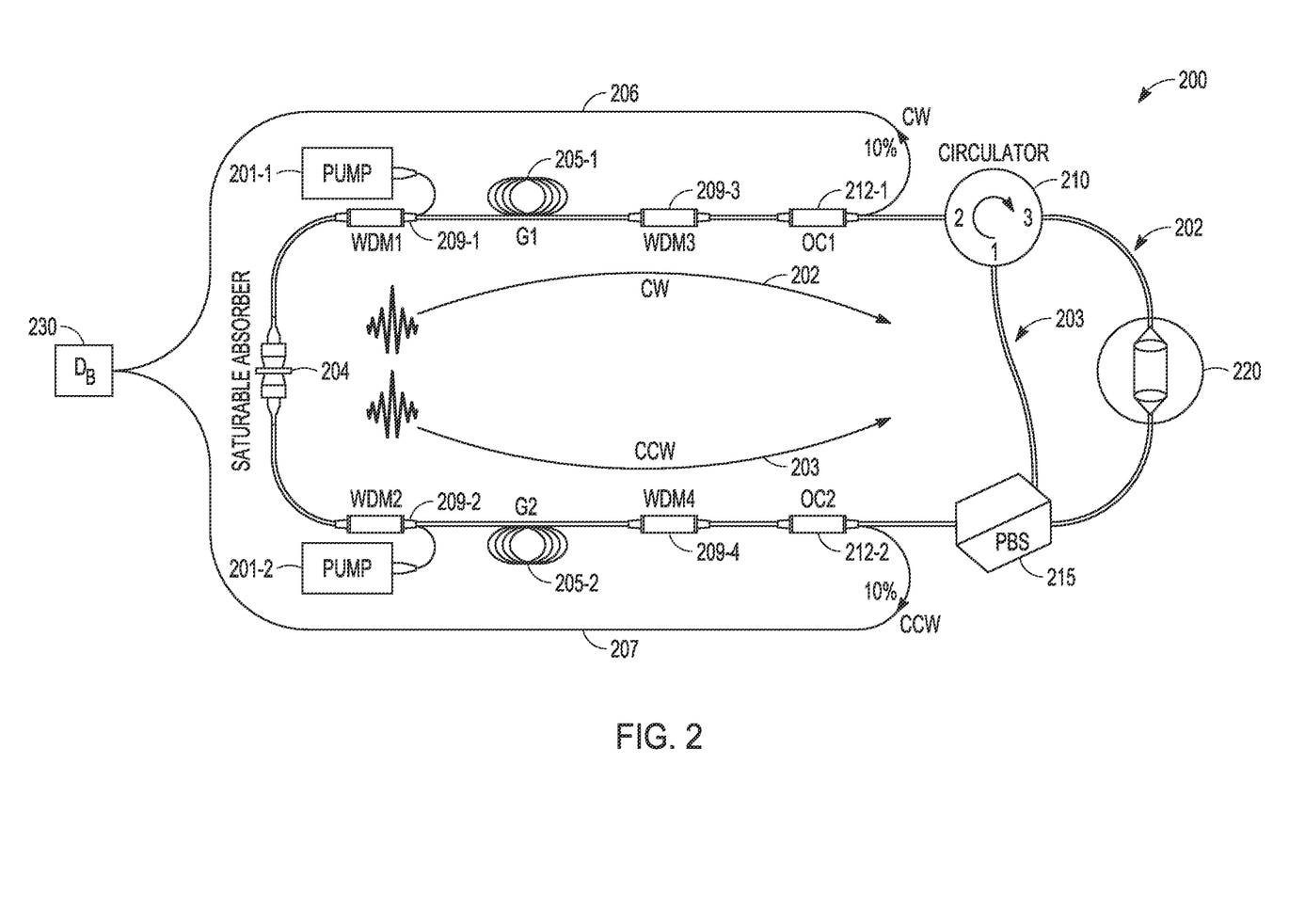
FIG. 2 is a schematic of an arrangement for an example polarization maintaining fiber laser cavity generating two cross-polarized counter-circulating pulses in an all-fiber configuration, in accordance with various embodiments.

FIG. 2 provides a schematic of an arrangement 200 for a PM fiber laser cavity generating two cross-polarized counter-circulating pulses using a polarizing beam splitter 215 that is an integrated polarizing beam splitter. The polarizing beam splitter 215 can be used with an optical delay device 220. One of the pulses circulates in the clockwise (cw) direction 202 and its counter-circulating pulse circulates in the counter-clockwise (ccw) direction 203. A sample to be measured can be arranged within the free space of delay line 220. Small variations of a distance property or index of refraction of the sample can be precisely measured by arrangement 200.

Shown in FIG. 2 are a number of components including PM gain fibers 205-1 and 205-2, laser pumps 201-1 and 201-2, a SA 204, WDMs 209-1, 209-2, 209-3, and 209-4, optical delay device 220, OCs 212-1 and 212-2, a circulator 210, and PBS 215, where G refers to fiber gain, s refers to s-polarized, and p refers to p-polarized.

Pump 201-1 injects laser light to gain fiber 205-1 (pulses in the case of an optical parametric oscillator) through WDM 209-1 coupled to SA 204 that is coupled to WDM 209-2 through which pump 201-2 injects light to gain fiber 205-2. Pumps 201-1 and 201-2 can be operated at 980 nm. Pumps 201-1 and 201-2 can be selected to provide other operational wavelengths. From SA 204, cw pulse 202 propagates through WDM 209-1 to PM gain fiber 205-1 providing a laser gain medium having gain G1. PM gain fiber 205-1 is coupled to WDM 209-3 that is coupled to OC 212-1, which couples cw pulse 202 to a detector $D_B$ 230 along path 206 and to circulator 210. OC 212-1 can provide, to $D_B$ 230, a portion of light input to OC 212-1. For example, the portion can be, but is not limited to, 10%. The detector $D_B$ 230 can be a beat note detector at which cw pulse 202 and ccw pulse 203 interact.

In arrangement 200, light that enters port 2 of circulator 210 exits port 3 and light that enters port 1 of circulator 210 exits port 2. Cw pulse 202 enters port 2 of circulator 210 and exits port 3 of circulator 210 to propagate to optical delay 220. From optical delay 220, cw pulse 202 is directed to PBS 215 through which cw pulse 202 propagates to OC 212-2 to WDM 209-4 to PM gain fiber 205-2 having a laser gain medium with gain G2. From PM gain fiber 205-2, cw pulse 202 propagates through WDM 209-2 back to SA 204.

From SA 204, ccw pulse 203 propagates through WDM 209-2 to PM gain fiber 205-2 providing a laser gain medium having gain G2. PM gain fiber 205-2 is coupled WDM 209-4 that is coupled to OC 212-2, which couples ccw pulse 203 to $D_B$ 230 along path 207 and to PBS 215 which directs ccw 103 to port 1 of circulator 210. OC 212-2 can provide, to $D_B$ 130, a portion of light input to OC 212-2. For example, the portion can be, but is not limited to, 10%. Ccw pulse 203 enters port 1 and exits port 2 of circulator 210 to propagate to OC 212-1 through which ccw pulse propagates to WDM 209-3. From WDM 209-3, ccw pulse 103 propagates to PM gain fiber 205-1. From PM gain fiber 205-1, ccw pulse 103 propagates through WDM 209-1 back to SA 204.

The circulating of the two counter-propagating, orthogonally polarized pulses cw pulse 202 and ccw pulse 203 can be viewed in the following manner.

cw 202: SA 204>WDM 209-1>G1>WDM 209-3>OC 212-1>2>3>optical delay 220>PBS 215>OC 212-2>WDM 209-4>G2>WDM 209-2>SA 204.

ccw 203: SA 204>WDM 209-2>G2>WDM 209-4>OC 212-2>PBS 215>1>2>OC 212-1>WDM 209-3>G1>WDM 209-1>SA 204.

A sample to be measured can be arranged within free space of optical delay 220 providing a difference between cw 202 and ccw 203. Small variations of a distance property or index of refraction of the sample can be precisely measured by the arrangement 200.

Figure 3:
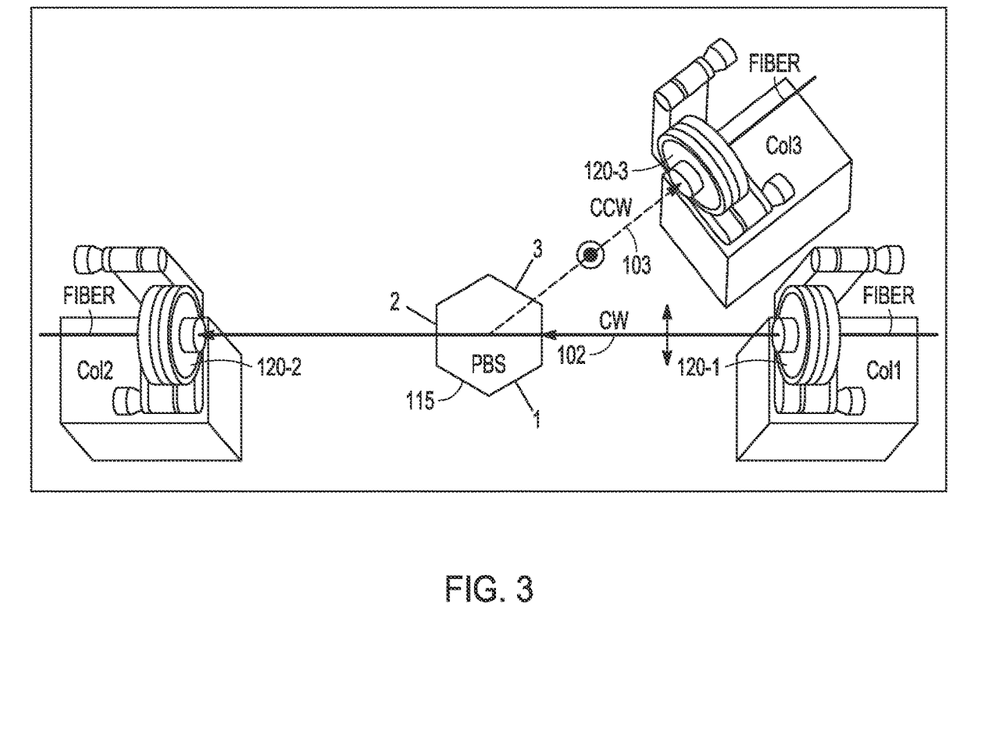
FIG. 3 illustrates an example experimental setup of a free space part of a laser associated with FIG. 1, in accordance with various embodiments.

FIG. 3 illustrates an experimental setup of a free space part of the orthogonally polarized ring fiber laser of FIG. 1 to separate the two orthogonal polarizations. FIG. 3 shows the experimental setup of the free-space part of the orthogonally polarized ring fiber laser with cw 102 propagating from Col 120-1 through PBS 115 to Col 120-2 and ccw 103 propagating from Col 120-2 through PBS 115 to Col 120-3

Figure 4A:
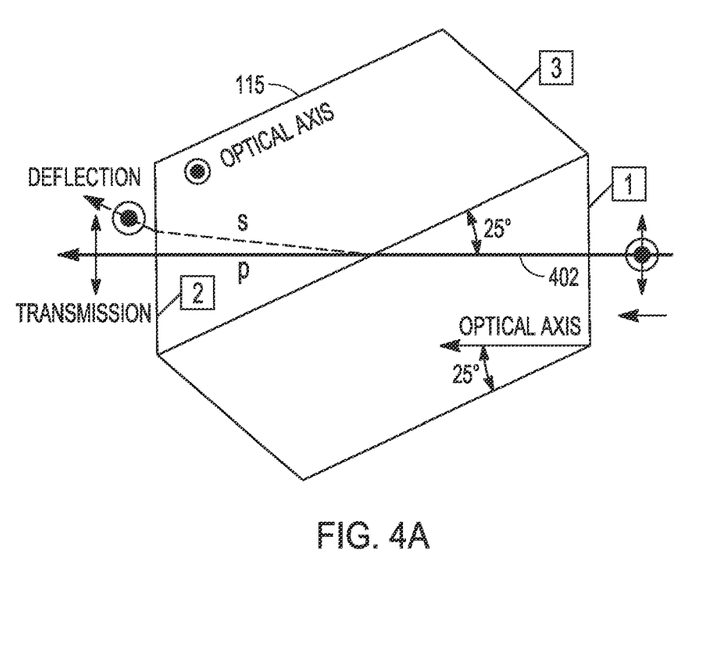
FIGS. 4A-4B illustrate an example operation of a lossless polarizing beam splitter used in the setup of FIG. 1 for clockwise and counter-clockwise directions in the laser, in accordance with various embodiments.
Figure 4B:
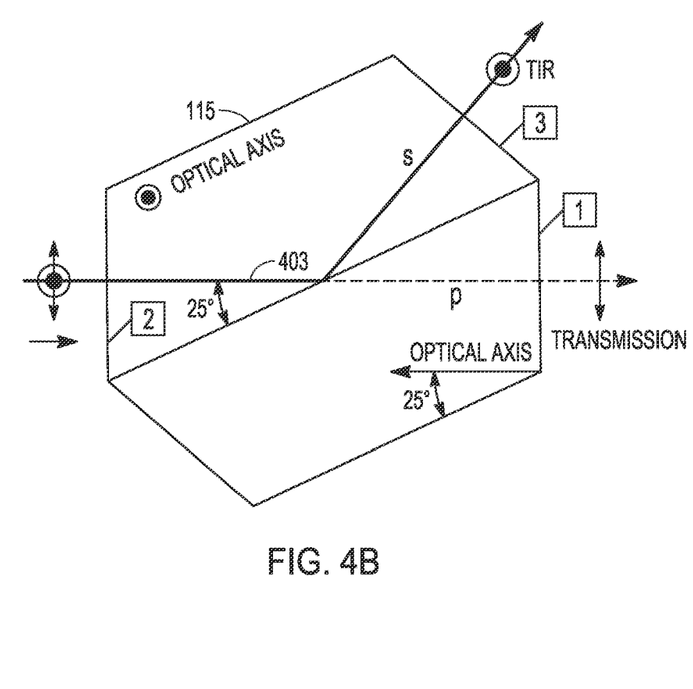

FIGS. 4A-B show operation of PBS 115 for both cw and ccw directions in the fiber laser of FIG. 1. The PBS 115 can be designed for the specific application in the fiber laser of FIG. 1 to separate two polarization modes of the cavity without being lossy. FIGS. 4A-B illustrate operation of a lossless PBS 115 used in the setup of FIG. 1 for cw and ccw directions in the laser. FIG. 4A shows operation of a lossless PBS 115 used in the setup of FIG. 1 for cw direction in the laser. FIG. 4B shows operation of lossless PBS 115 used in the setup of FIG. 1 for ccw direction in the laser. The lossless PBS 115 can include two $YVO_4$ prisms optically contacted.

In FIG. 4A, a beam 402 is incident parallel to the optic axis at 250 from the interface. The upper prism has its optic axis normal to the plane of FIG. 4A. The beam 402, p-polarized, traverses the interface without loss, being an ordinary ray in both prisms. The dashed ray from beam 402, s-polarized, is deflected being extraordinary in upper prism. In FIG. 4B, the s-component of a beam 403 is totally reflected on the interface being an extraordinary ray in the upper prism. The p-component of beam 403, shown as the dashed line from beam 403, is transmitted through the PBS 115 without loss being an ordinary ray in both prisms.

Figure 5A:
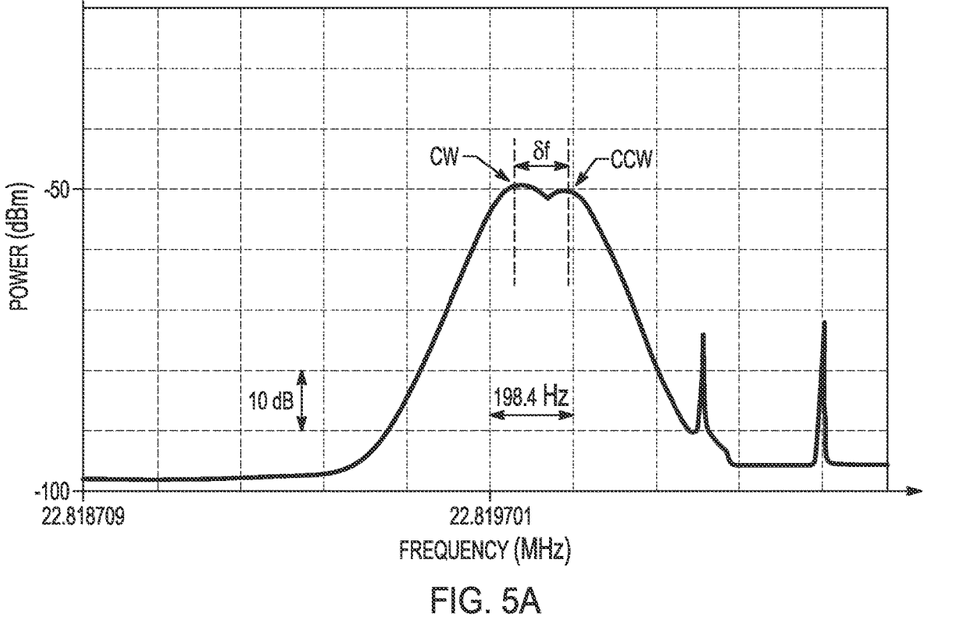
FIGS. 5A-5B illustrate an example radio frequency spectrum of pulse trains in opposite directions of a cross-polarized fiber laser with different and same repetition rates, in accordance with various embodiments.
Figure 5B:
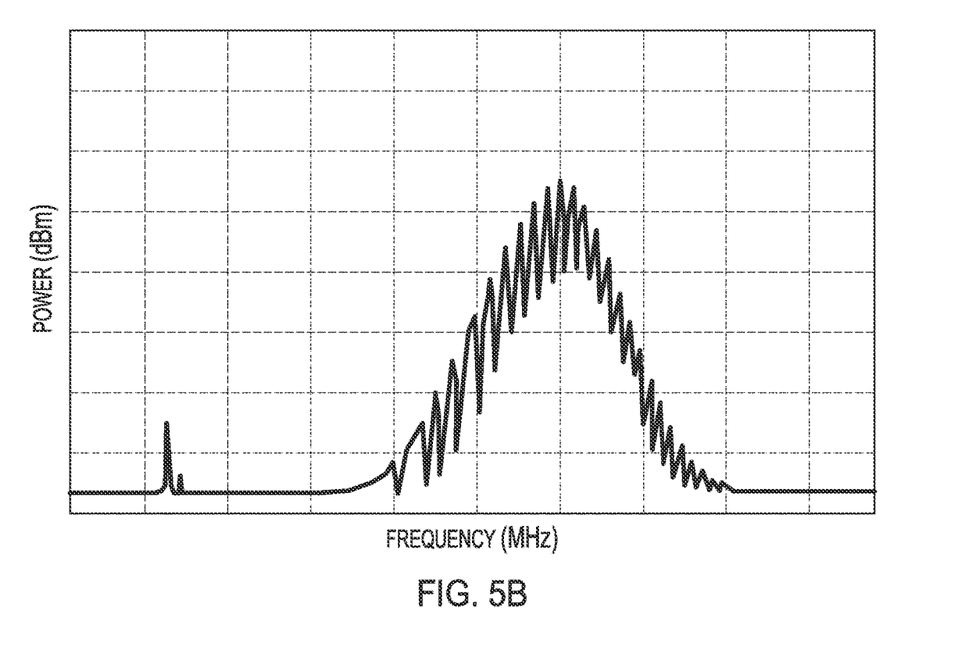

FIGS. 5A-B illustrate measurement results of radio frequency spectrum of pulse trains in opposite directions of a cross-polarized fiber laser with different and same repetition rates. FIG. 5A shows a radio frequency spectrum of the pulse trains in opposite directions of the cross-polarized fiber laser with different repetition rates. FIG. 5B shows a radio frequency spectrum of the pulse trains in opposite directions of the cross-polarized fiber laser with nearly the same repetition rate. The scales on x and y axes are same in both graphs with bandwidth resolution of 100 Hz, where CW refers to clockwise and CCW refers to counter-clockwise.

Figure 6A:
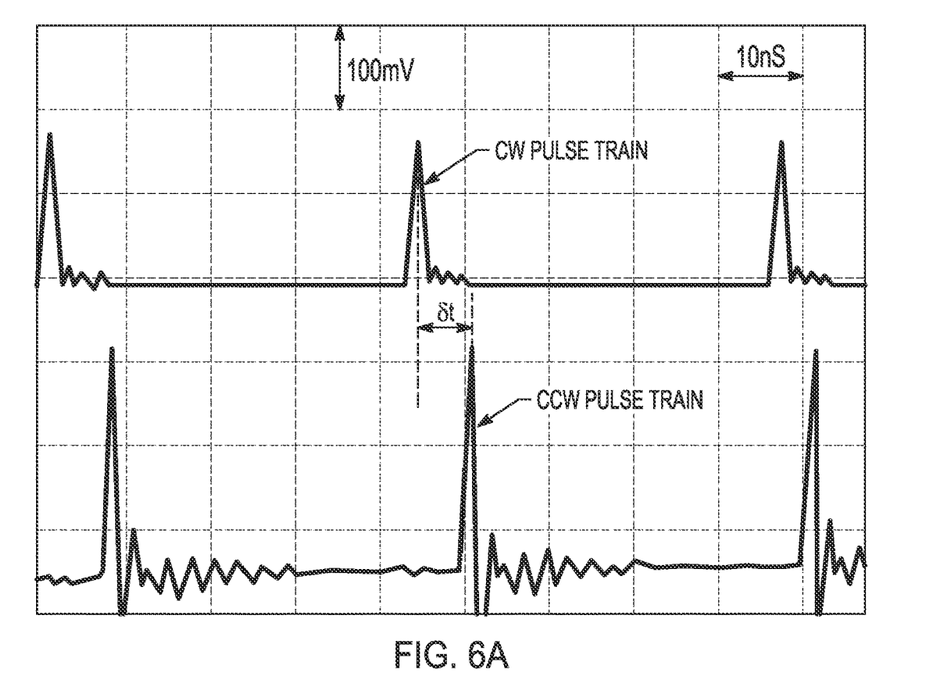
FIG. 6A indicates an example of two pulse trains in opposite directions of the fiber laser shown in FIG. 1, in accordance with various embodiments.
Figure 6B:
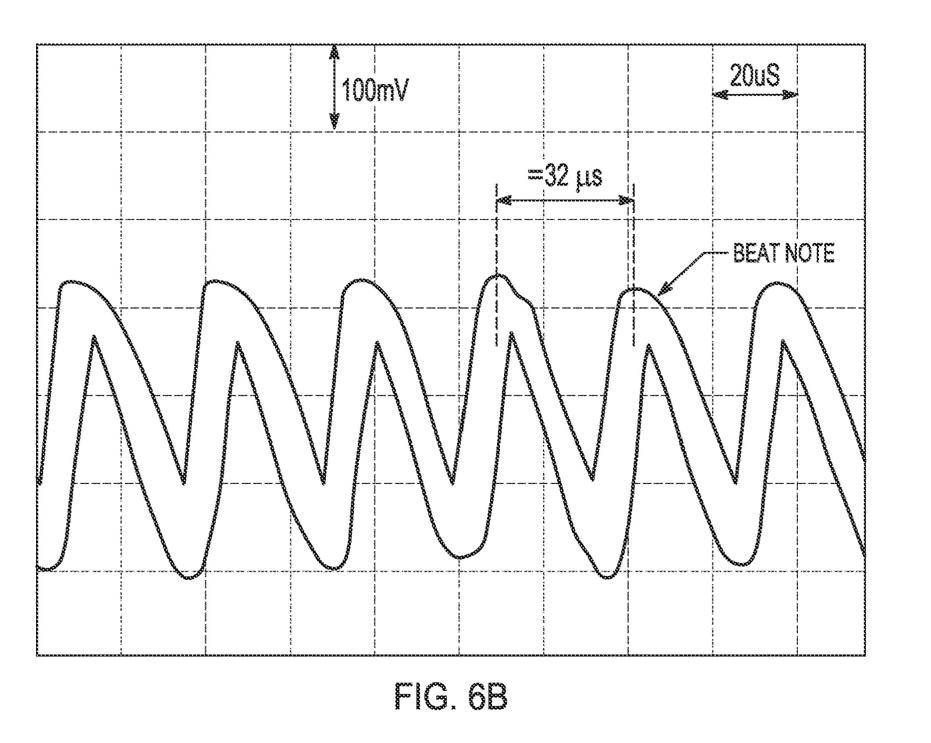
FIG. 6B shows an example of envelope of a modulated pulse train which indicates the interference pattern of two interfering pulses due to the asymmetry in the cavity of the fiber laser shown in FIG. 1, in accordance with various embodiments.

FIG. 6A indicates two pulse trains in opposite directions of the fiber laser shown in FIG. 1. FIG. 6A shows oscilloscope traces of the clockwise (upper) pulse trains and counter-clockwise (lower) pulse trains in the cross-polarized fiber laser. FIG. 6B shows an envelope of the interference pattern (modulated pulse train) of interfering pulses in cw and ccw directions due to the asymmetry in the cavity of the fiber laser shown in FIG. 1. FIG. 6B shows an envelope of the modulated pulse train due to the asymmetry in the ring cavity, which measures the beat note frequency of the laser cavity as $$\Delta v = \frac{1}{32\ \mu s} \approx 31\ \text{kHz}.$$

Figure 7:
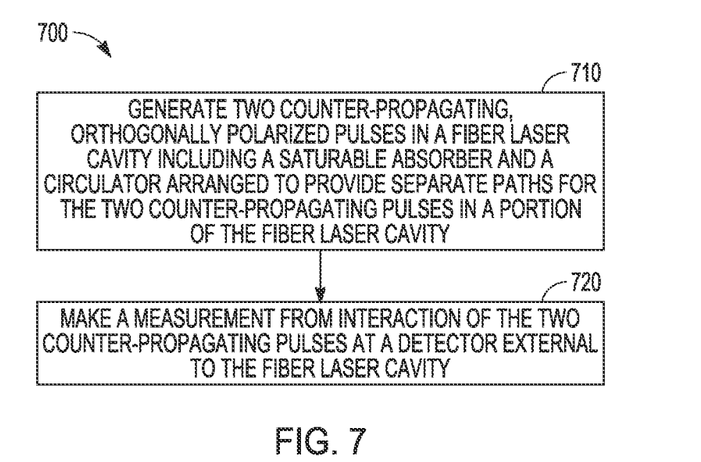
FIG. 7 is a flow diagram of features of an embodiment of an example measurement method, in accordance with various embodiments.

FIG. 7 is a flow diagram of features of an embodiment of an example measurement method 700. The measurement method 700 can be conducted with a fiber laser having a fiber laser cavity similar to or identical to the arrangement of a fiber laser cavity of FIG. 1 or FIG. 2. At 710, two counter-propagating, orthogonally polarized pulses are generated in a fiber laser cavity. The fiber laser cavity includes a saturable absorber coupled to a first polarization maintaining gain fiber and to a second polarization maintaining gain fiber. The fiber laser cavity includes a circulator arranged to provide separate paths for the two counter-propagating pulses in a portion of the fiber laser cavity. Generation of the two counter-propagating, orthogonally polarized pulses in the fiber laser cavity can include injecting first laser light from a first pump laser to the gain section G1 (105-1 or 205-1) and injecting pump light from a second pump laser to the gain section G2 (105-2 or 205-2)).

At 710, a measurement from interaction of the counter-propagating pulses is made at a detector external to the fiber laser cavity. The measurement method 700 can be applied to a number of measurement scenarios. Making the measurement can include operating with a sample operatively disposed in the fiber laser cavity to impose a phase shift to the cw or ccw pulse. Making the measurement can include determining a very small displacement in the laser cavity due to the presence of a sample operatively disposed in the fiber laser cavity to impose a phase shift to the cw or ccw pulse. Making the measurement can include determining an index of refraction of a sample operatively disposed in the fiber laser cavity to impose a phase shift to the cw or ccw pulse.

Variations of method 700 or methods similar to method 700 can include a number of different embodiments that may be combined depending on the application of such methods and/or the architecture of devices or systems in which such methods are implemented. Such methods can include using a beat note detector as the detector in the measurement. Variations of such methods can include operating a gyroscope from making the measurement.

In various embodiments, a fiber laser comprises a first polarization maintaining gain fiber, a second polarization maintaining gain fiber, and a saturable absorber. The saturable absorber is arranged with the first polarization maintaining gain fiber and the second polarization maintaining gain fiber to generate counter-propagating pulses being orthogonally polarized with respect to each other. The fiber laser includes a circulator arranged to provide separate paths for the counter-propagating pulses in a portion of the fiber laser. As a variation to the architecture, this fiber laser sensor can be build using only one portion of gain fiber in either side of the SA.

Variations of such a fiber laser can include a number of different embodiments that may be combined depending on the application of such fiber lasers and/or the architecture in which such fiber lasers are implemented. Such fiber lasers can include a polarizing beam splitter, a first collimator, a second collimator, and a third collimator. The first collimator can be arranged to couple the cw pulse from the circulator to the polarizing beam splitter. The second collimator can be arranged to couple the polarizing beam splitter to the second polarization maintaining gain fiber. The third collimator can be arranged to couple the ccw pulse from the polarizing beam splitter to the circulator. The three collimators are separated by free space due to the presence of the polarizing beam splitter. The collimators are connected to the circulator using fiber optics. The free space part can be limited to the space between all three collimators. In other words, the three collimators can be separated by free space. The polarizing beam splitter can include two $YVO_4$ prisms.

Variations of such a system can include the fiber laser having a fiber integrated polarizing beam splitter coupled to the second polarization maintaining gain fiber. An optical delay device can be arranged to couple the cw or ccw pulse from the circulator to the fiber integrated polarizing beam splitter.

In various embodiments, a sensing system comprises a detector and a fiber laser arranged to provide two counter-propagating, orthogonally polarized pulses to the detector. The fiber laser can include a first polarization maintaining gain fiber, a second polarization maintaining gain fiber, and a saturable absorber. The saturable absorber can be arranged with the first polarization maintaining gain fiber and the second polarization maintaining gain fiber to generate the two counter-propagating, orthogonally polarized pulses as clockwise pulses and counter-clockwise pulses. The fiber laser can include a circulator arranged to provide separate paths for the clockwise pulses and counter-clockwise pulses in a portion of the fiber laser.

The sensing system can operate on a sample under test with the fiber laser arranged to locate the sample under test to receive, directed from the circulator, clockwise pulses or counter-clockwise pulses. The sensing system can be implemented with the detector being a beat note detector.

Variations of such a sensing system can include a number of different embodiments that may be combined depending on the application of such sensing systems and/or the architecture in which such sensing systems are implemented. Such sensing systems can include the fiber laser structured to include a polarizing beam splitter, a first collimator, a second collimator, and a third collimator. The first collimator can be arranged to couple the clockwise pulses from the circulator to the polarizing beam splitter. The second collimator can be arranged to couple the polarizing beam splitter to the second polarization maintaining gain fiber. The third collimator can be arranged to couple the counter-clockwise pulses from the polarizing beam splitter to the circulator. The first, second, and third three collimators can be separated by free space. The polarizing beam splitter can include two $YVO_4$ prisms.

Variations of such a sensing system can include the fiber laser having a fiber integrated polarizing beam splitter coupled to the second polarization maintaining gain fiber. The fiber laser can include an optical delay device arranged to couple the clockwise pulses from the circulator to a fiber integrated polarizing beam splitter.

Figure 8:
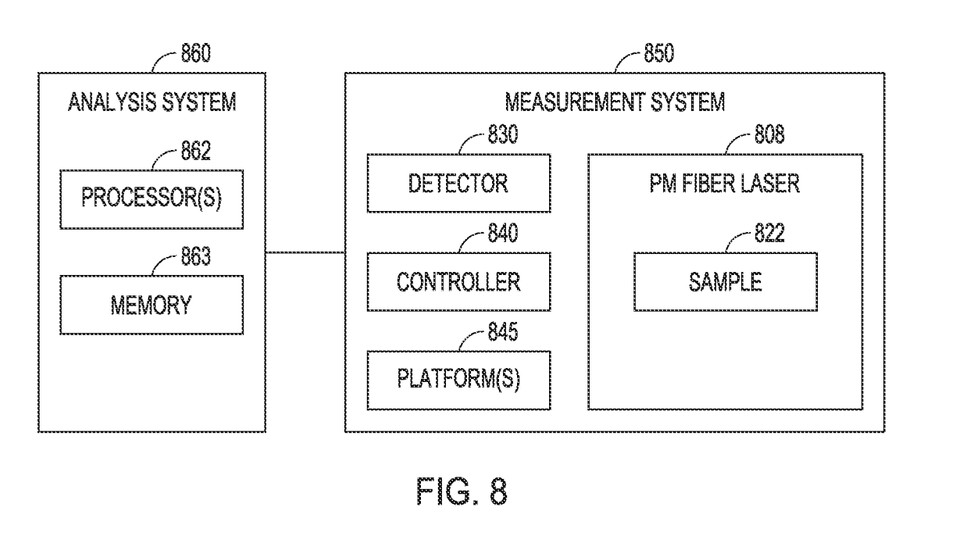
FIG. 8 illustrates an embodiment of an example arrangement using a bidirectional mode-locked polarization maintaining fiber laser with two counter-propagating, orthogonally polarized pulses to make measurements of a sample, in accordance with various embodiments.

FIG. 8 illustrates an embodiment of an example arrangement using a bidirectional mode-locked all-PM fiber laser with two counter-propagating, orthogonally polarized pulses to make measurements of a sample 822. The arrangement includes a measurement system 850 that operates on sample 822. The measurement system 850 can include a PM fiber laser 808 arranged according to any of the PM fiber laser arrangements or variations thereof as taught herein. The sample 822 under test can operatively be disposed in the laser cavity of the PM fiber laser 808. PM fiber laser 808 generates two counter-propagating, orthogonally polarized pulses to make measurements of sample 822. Two outputs of the PM fiber laser 808, reflecting the two counter-propagating pulses, are directed to a detector 830 of the measurement system 850.

The measurement system 850 can include a controller 840 to control and manage one or more platforms 845 that hold sample 822 or hold components of the laser cavity of the PM fiber laser 808, where one or more of the components of the PM fiber laser 808 can direct propagation of the two counter-propagating, orthogonally polarized pulses with the laser cavity. The one or more platforms 845 can include piezoelectric devices for adjustment of the components of the laser cavity, including adjustment of positions of the components relative to each other.

Signals generated from interaction of the two counter-propagating pulses are collected in detector 830. Detector 830 can include a beat node detector. The measurement system 850 can be coupled, wired or wirelessly, to an analysis system 860 to process information regarding the sample, which information is obtained through the interrogation by the two counter-propagating pulses circulating in the PM fiber laser 808 of measurement system 850. Analysis system 860 can include a memory 863 storing instructions and one or more processors 862 to execute the instructions to process the information obtained through the interrogation by measurement system 850. The instructions executed by the one or more processes 862 can include instructions to control the measurement system 850.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments. Various embodiments can use permutations and/or combinations of embodiments described herein. Other embodiments will be apparent to those skilled in the art from studying the embodiments disclosed herein. It is to be understood that the above description is intended to be illustrative, and not restrictive, and that the phraseology or terminology employed herein is for the purpose of description.

What is claimed is:

1. A fiber laser comprising:
   a first polarization maintaining gain fiber;
   a second polarization maintaining gain fiber;
   a saturable absorber arranged with the first polarization maintaining gain fiber and the second polarization maintaining gain fiber to synchronize clockwise and counter-clockwise pulses, with the clockwise and counter-clockwise pulses being orthogonally polarized with respect to each other;
   a polarizing beam splitter; and
   a circulator coupled to the polarizing beam splitter such that the circulator and the polarizing beam splitter are arranged to provide separate paths for the clockwise and counter-clockwise pulses in a portion of the fiber laser.

2. The fiber laser of claim 1, wherein the fiber laser includes:
   a first collimator arranged to couple pulses propagating in one direction from the circulator to the polarizing beam splitter;
   a second collimator arranged to couple the polarizing beam splitter to the second polarization maintaining gain fiber; and
   a third collimator arranged to couple pulses propagating in another direction from the polarizing beam splitter to the circulator.

3. The fiber laser of claim 2, wherein the first, second, and third three collimators are separated by free space.

4. The fiber laser of claim 2, wherein the polarizing beam splitter includes two $YVO_4$ prisms.

5. The fiber laser of claim 2, wherein the fiber laser includes the polarizing beam splitter structured as a fiber integrated polarizing beam splitter coupled to the second polarization maintaining gain fiber.

6. The fiber laser of claim 5, wherein the fiber laser includes an optical delay device arranged to couple the propagating pulses from the circulator to the fiber integrated polarizing beam splitter.

7. A sensing system comprising:
   a detector; and
   a fiber laser arranged to provide two counter-propagating, orthogonally polarized pulses to the detector, the fiber laser including:
      a first polarization maintaining gain fiber;
      a second polarization maintaining gain fiber;
      a saturable absorber arranged with the first polarization maintaining gain fiber and the second polarization maintaining gain fiber to generate the two counter-propagating, orthogonally polarized pulses as clockwise pulses and counter-clockwise pulses;
      a polarizing beam splitter; and
      a circulator coupled to the polarizing beam splitter such that of the circulator and the polarizing beam splitter are arranged to provide separate paths for the clockwise pulses and counter-clockwise pulses in a portion of the fiber laser.

8. A sensing system comprising:
   a detector; and
   a fiber laser arranged to provide two counter-propagating, orthogonally polarized pulses to the detector, the fiber laser including:
      a first polarization maintaining gain fiber;
      a second polarization maintaining gain fiber;
      a saturable absorber arranged with the first polarization maintaining gain fiber and the second polarization maintaining gain fiber to generate the two counter-propagating, orthogonally polarized pulses as clockwise pulses and counter-clockwise pulses; and
      a circulator arranged to provide separate paths for the clockwise pulses and counter-clockwise pulses in a portion of the fiber laser, wherein the fiber laser is arranged to locate a sample under test to receive clockwise pulses or counter-clockwise pulses directed from the circulator.

9. A sensing system comprising:
   a detector; and
   a fiber laser arranged to provide two counter-propagating, orthogonally polarized pulses to the detector, the fiber laser including:
      a first polarization maintaining gain fiber;
      a second polarization maintaining gain fiber;
      a saturable absorber arranged with the first polarization maintaining gain fiber and the second polarization maintaining gain fiber to generate the two counter-propagating, orthogonally polarized pulses as clockwise pulses and counter-clockwise pulses; and
      a circulator arranged to provide separate paths for the clockwise pulses and counter-clockwise pulses in a portion of the fiber laser, wherein the detector is a beat note detector.

10. The sensing system of claim 7, wherein the fiber laser includes:
   a first collimator arranged to couple the clockwise pulses from the circulator to the polarizing beam splitter;
   a second collimator arranged to couple the polarizing beam splitter to the second polarization maintaining fiber; and
   a third collimator arranged to couple the counter-clockwise pulses from the polarizing beam splitter to the circulator.

11. The sensing system of claim 10, wherein the first, second, and third three collimators are separated by free space.

12. The sensing system of claim 10, wherein the polarizing beam splitter includes two $YVO_4$ prisms.

13. The sensing system of claim 10, wherein the fiber laser includes the polarizing beam splitter structured as a fiber integrated polarizing beam splitter coupled to the second polarization maintaining gain fiber.

14. The sensing system of claim 7, wherein the fiber laser includes an optical delay device arranged to couple the clockwise pulses from the circulator to the polarizing beam splitter structured as a fiber integrated polarizing beam splitter.

15. A method comprising:
   generating two counter-propagating, orthogonally polarized pulses in a fiber laser cavity by injecting light from a first pump laser to a first polarization maintaining gain fiber and injecting light from a second pump laser to a second polarization maintaining gain fiber, with the fiber laser cavity including:
      a saturable absorber arranged with the first polarization maintaining gain fiber and the second polarization maintaining gain fiber to generate the two counter-propagating, orthogonally polarized pulses as clockwise and counter-clockwise pulses;
      a polarizing beam splitter; and
      a circulator coupled to the polarizing beam splitter such that the circulator and the polarizing beam splitter are arranged to provide separate paths for the clockwise and counter-clockwise pulses in a portion of the fiber laser cavity; and
   making a measurement from interaction of the clockwise and counter-clockwise pulses at a detector external to the fiber laser cavity.

16. The method of claim 15, wherein making the measurement includes operating with a sample operatively disposed in the fiber laser cavity to receive the clockwise pulses or the counter-clockwise pulses directed from the circulator or from the polarizing beam splitter in the fiber laser cavity.

17. A method comprising:
   generating two counter-propagating, orthogonally polarized pulses in a fiber laser cavity by injecting light from a first pump laser to a first polarization maintaining gain fiber and injecting light from a second pump laser to a second polarization maintaining gain fiber, with the fiber laser cavity including:
- a saturable absorber arranged with the first polarization maintaining gain fiber and the second polarization maintaining gain fiber to generate the two counter-propagating, orthogonally polarized pulses as clockwise and counter-clockwise pulses; and
- a circulator arranged to provide separate paths for the clockwise and counter-clockwise pulses in a portion of the fiber laser cavity; and making a measurement from interaction of the clockwise and counter-clockwise pulses at a detector external to the fiber laser cavity, wherein the method includes operating a gyroscope from making the measurement.

18. The method of claim 15, wherein making the measurement includes determining a displacement due to presence of a sample operatively disposed in the fiber laser cavity to receive the clockwise pulses or the counter-clockwise pulses directed from the circulator or from the polarizing beam splitter in the fiber laser cavity.

19. The method of claim 15, wherein making the measurement includes determining an index of refraction of a sample operatively disposed in the fiber laser cavity receive the clockwise pulses or the counter-clockwise pulses directed from the circulator or from the polarizing beam splitter in the fiber laser cavity.

20. A method comprising:
generating two counter-propagating, orthogonally polarized pulses in a fiber laser cavity by injecting light from a first pump laser to a first polarization maintaining gain fiber and injecting light from a second pump laser to a second polarization maintaining gain fiber, with the fiber laser cavity including:
- a saturable absorber arranged with the first polarization maintaining gain fiber and the second polarization maintaining gain fiber to generate the two counter-propagating, orthogonally polarized pulses as clockwise and counter-clockwise pulses; and
- a circulator arranged to provide separate paths for the clockwise and counter-clockwise pulses in a portion of the fiber laser cavity; and making a measurement from interaction of the clockwise and counter-clockwise pulses at a detector external to the fiber laser cavity, wherein the detector is a beat note detector.

* * * * *